United States Patent [19]

McCarty et al.

[11] 4,424,100

[45] Jan. 3, 1984

[54] METHOD FOR PRODUCING ARTICLES BY DEFORMATION SUBSTRATES HAVING A RADIATION CURED SUBSTRATE

[75] Inventors: William H. McCarty, Whitehouse Station; John P. Guarino, Lawrenceville; Frank A. Nagy, Edison, all of N.J.

[73] Assignee: Mobil Oil Corporation, New York, N.Y.

[21] Appl. No.: 200,117

[22] Filed: Oct. 24, 1980

Related U.S. Application Data

[63] Continuation of Ser. No. 36,191, May 4, 1979, abandoned.

[51] Int. Cl.$^3$ ............................ C08F 8/00; B05D 3/06
[52] U.S. Cl. ......................... 204/159.15; 204/159.16; 204/159.22; 204/159.23; 427/44; 427/54.1; 72/46
[58] Field of Search ................... 427/44, 54.1; 204/159.15, 159.16, 159.22, 159.23; 72/46

[56] References Cited

U.S. PATENT DOCUMENTS

| | | | |
|---|---|---|---|
| 3,206,848 | 9/1965 | Rentmeester | 72/46 |
| 4,072,592 | 2/1978 | Due et al. | 428/413 |
| 4,268,580 | 5/1981 | Rock et al. | 427/44 |

Primary Examiner—Wilbert J. Briggs, Sr.
Attorney, Agent, or Firm—Charles A. Huggett; Michael G. Gilman; Edward J. Trojnar

[57] ABSTRACT

Coating compositions comprising a combination of a minor amount of high MW resin of low functionality with a large proportion of monoethylenically unsaturated monomer having a relatively high Tg to provide a coating which, when cured, will possess a degree of hardness and flexibility enabling it to withstand severe fabrication and/or flexure stresses without film failure or loss of adhesion to the substrate. By controlling the molar ratio of unsaturated carbon bonds present in polyunsaturated molecules to those present in monounsaturated molecules, one is able to predict and control the physical performance and character of the cured coating.

14 Claims, 3 Drawing Figures

METHOD FOR PRODUCING ARTICLES BY DEFORMATION SUBSTRATES HAVING A RADIATION CURED SUBSTRATE

This application is a continuation of U.S. application Ser. No. 36,191, filed May 4, 1979, now abandoned.

BACKGROUND OF THE INVENTION

1. Field of the Invention

The invention is concerned with the formulation of polymerizable coating compositions suitable for coating substrates which will subsequently undergo fabrication into a wide range of useful articles.

2. Description of the Prior Art

It is frequently the practice in the fabrication arts to apply coating compositions to flat sheet material and cure or "set" the coating prior to forming the flat sheet into a finished fabricated article. For example, in the fabrication of metal bottle caps for soft-drink bottles, it is a common practice to coat thin aluminum sheet stock and cure the coating composition before the caps are formed or "stamped" from the sheet stock using conventional fabricating technology. The coated sheet material is usually stockpiled in inventory prior to fabrication to ensure an adequate supply during fabrication operations. Such inventories may consist of stocks of coated substrates in sheet form or in rolls, depending upon whether the fabrication operation requires discrete sheets or continuous webs of the substrate.

In order to be useful, coatings for this type of application must be resistant to interpenetration with contact suffaces so as to permit easy unstacking or unrolling of the coated inventory for subsequent fabrication. This undesirable interpenetration phenomenon, which is commonly known as blocking, occurs when two coated surfaces are in contact with one another and refers to their tendency to stick together and form minute welds, thereby greatly increasing the coefficient of friction between the surfaces and at times even causing the coating to adhere more strongly to the adjacent coated surface than to the substrate. In addition, the cured coating must be sufficiently adherent to the substrate and sufficiently deformable to withstand the fabrication stresses and permit fabrication into the finished article without removal from the substrate (e.g. "peeling") or otherwise failing to provide a continuous protective film.

It is known that radiation curable coatings may be prepared by blending materials which contain one or more ethylenically unsaturated groups per molecule, such groups being reactive in free radical polymerization mechanisms. The physical properties of coatings made from such blends vary from hard to soft and from ductile to brittle depending upon the relative amount of unsaturation in the blends and the chemical structure pendent to the unsaturated bonds. It is also known that free radical polymerization of ethylenically unsaturated bonds may be inhibited by the presence of oxygen. This inhibition not only materially slows the rate of polymerization, but also produces a product of reduced polymerization chain length. This reduction in chain length manifests itself by a softening of the cured coating and, in extreme cases, can produce a material which is tacky or even wet to the touch. Such undesirable condition makes it difficult to unstack the coated substrate from inventory.

A desirable coating then must be adherent to the substrate both before and after fabrication, must be resistant to blocking, and must also be sufficiently deformable or elastic to allow fabrication of a wide range of shapes.

SUMMARY OF THE INVENTION

The present invention describes the material properties, blends of materials and curing conditions that provide coatings which are desirably adherent, resistant to blocking in the stack, and sufficiently deformable for use on a wide range of fabricated articles requiring severe deformation. Simply stated, the invention comprises:

(a) controlling the molar ratio of unsaturated carbon bonds present in polyunsaturated molecules to those present in monounsaturated molecules, expressed as a decimal fraction which we refer to as the $\rho$(rho) value, below about 0.5 and preferably below 0.2;

(b) selection of molecular structure pendent to the unsaturated sites to provide a glass transition temperature (Tg) in the cured coating between about $-10°$ C. and $+100°$ C., preferably between about $+15°$ C. and $+100°$ C.; and (c) the combined use of (1) a chemically inert atmosphere during cure, such as provided by nitrogen gas or by combustion of natural gas to provide an atmosphere substantially free of oxygen, (2) in the case of cure by ultraviolet light, an efficient photoinitiator of free radicals, preferably a blend of photoinitiators which exhibit absorption maxima in different regions of the ultraviolet spectrum, such photoinitiators being present in amounts of from about 0.5% to 7% by weight and preferably between about 1% and 5% by weight, and (3) exposure of the coating to actinic radiation or to electron beams to effect a cure of at least 85% by weight of the volatile components in the coating to a nonvolatile state.

The coating compositions resulting from practice of our invention comprise formulations which are a combination of relatively low amounts of high molecular weight resins having low functionality (unsaturation) with a large proportion of monoethylenic monomer. Such combinations, when formulated in the manner disclosed, will provide a combination of hardness and flexibility which is unusual in a radiation cured coating.

Although preferred embodiments of the invention envision utilization of such deformable coating compositions to coat flat, normally rigid substrates which are subsequently permanently deformed or "fabricated" into normally rigid articles or parts of articles, it is contemplated that the unique compositions of our invention may also be useful as coatings for flexible materials. We have discovered that there is a direct relationship between the value of the quantity $\rho$ and the adhesive quality of the cured coating film. In general, the lower the $\rho$-value the better the adhesion of the coating to the substrate. Coating compositions having a $\rho$-value below 0.5 have particular utility in coating flexible materials such as metal foils, plastic films, paper wrappers and so forth.

DESCRIPTION OF SPECIFIC EMBODIMENTS

Figure 3:
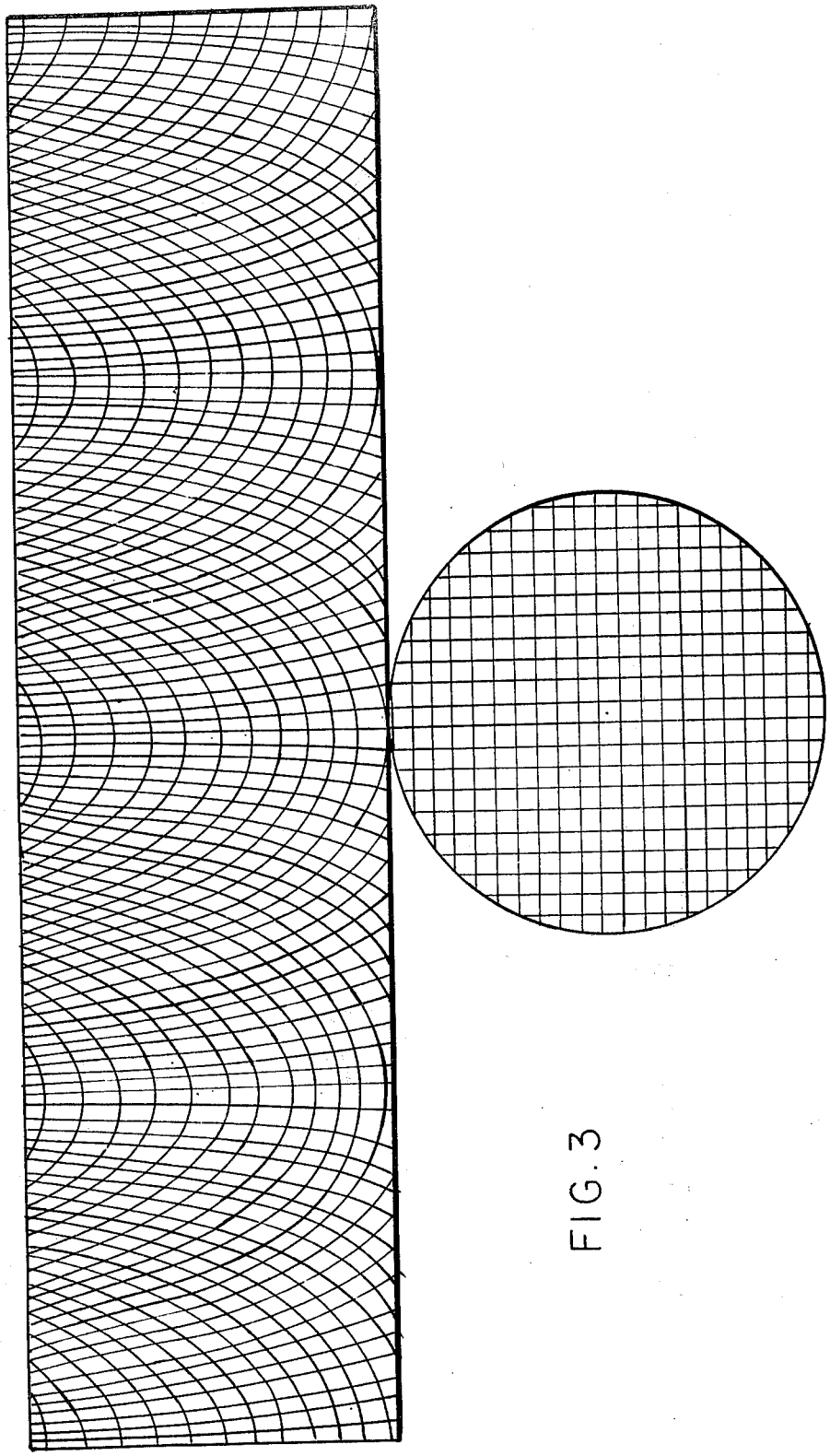
FIG. 3 is a two-dimensional representation of the fabricated container of FIG. 2.
Figure 2:
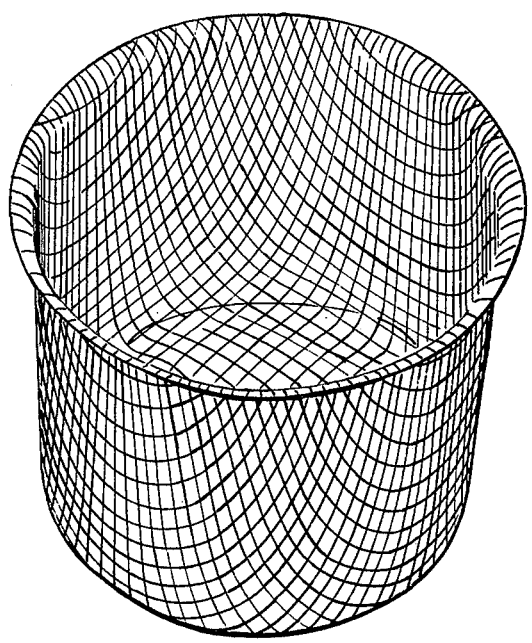
FIG. 2 is a perspective of a container fabricated from the coated substrate of FIG. 1, the deformation of the grid pattern illustrating the deformation and stress patterns experienced by the coating as a result of fabrication.
Figure 1:
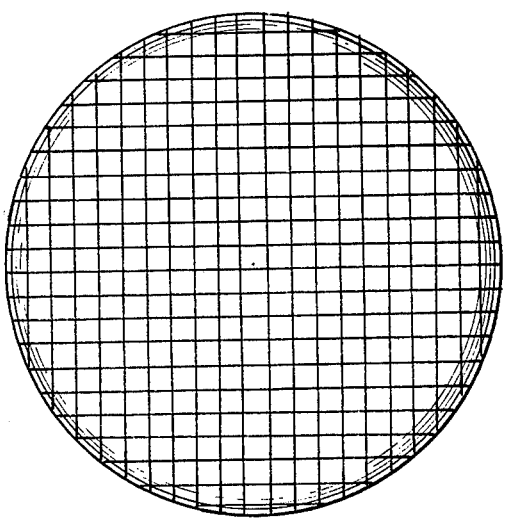
FIG. 1 illustrates a flat rigid substrate prior to fabrication, the grid pattern representing the cured coating.

Our invention is with regard to the formulation and cure of coating compositions having a broad range of utility in fabrication of useful articles from pre-coated substrates, and to a method for preparing desirable coating compositions for such pre-coated substrates.

In the manufacture of many useful and desirable articles and containers which must be covered or sealed with a coating to prevent oxidation or other physical or chemical deterioration of the article (as in metal cans), or to prevent undesirable contact between the substrate and the contents of the container (as with regard to food containers), or simply to enhance the aesthetic appeal of the article, it is frequently the practice to apply the coating composition to the flat substrate and effect its cure prior to fabrication of the article. In the process of fabrication the substrate, and hence the coating covering its surface, is deformed to alter the shape and/or dimensions or the original sheet. This operation results in severe stresses on the cured film, as illustrated by the drawings wherein the gridwork represents the coating film and visually illustrates the gross distortions which a useful coating must withstand. Representative of applications wherein the coating may be applied to the substrate and cured prior to fabrication are containers such as drawn cans, food trays, refrigerator doors, various automotive body parts, molded egg cartons and so forth. Absolutely essential to successful fabrication are the requirements that the coatings be adhesive to the substrate after fabrication and be able to withstand the deformation stresses without cracking, peeling or failing in any way. Up until now the design of a successful coating formulation has been a hit-or-miss proposition wherein very specific combinations would be employed in an attempt to solve very specific application problems on a totally empirical basis.

Central to our invention is the discovery that, by controlling and manipulating the molar ratio of polyunsaturate molecules to monounsaturated molecules in the uncured coating composition to fall within specified ranges, one may have a profound and desirable affect on the physical characteristics of the cured coating film. We refer to this parameter as the $\rho$(rho) value of the coating composition and it is herein defined as the molar ratio, expressed as a decimal fraction, of unsaturated carbon bonds present in polyunsaturated components of the composition to unsaturated carbon bonds present in monounsaturated components. For the purposes of this invention, the $\rho$-value should be below about 0.5, and preferably below 0.2, to result in a desirable cure coating. Particular embodiments may call for their own preferred limit of $\rho$. For instance, in order to provide superior adhesion to impermeable substrates such as metal foil, plastics and so forth, a $\rho$-value of below 0.2 is preferred. Also, in applications calling for cured coatings which must withstand very severe fabrication stresses, $\rho$-values of less than approximately 0.2 are the most preferable. Likewise, if the coated substrate is expected to undergo substantial amounts of stress resulting from flexing, it is essential that the coating possess exceptional adhesion properties as well as good elasticity. It is found that control of $\rho$ to below 0.5, and preferably below 0.2, will result in compositions useful in such applications.

The unsaturated carbon bonds referred to herein are generally carbon-carbon double bonds within the molecular structure of the organic components of the coating composition. Such unsaturation may be terminal-i.e. between a terminal carbon atom and the next adjacent carbon atom-or may be internal unsaturation, although terminal or ethylenic unsaturation is normally found to be more reactive in polymer cross-linking mechanisms and for that reason is preferred. Acrylate unsaturation is especially preferred.

All sorts of polyethylenically unsaturated resins are known and readily available and may be utilized in this invention. Thus, hydroxy functional polyesters can be esterified with acrylic acid or condensed with N-methylol acrylamide to provide polyethylenic resins useful herein. Similarly, N-methylol acrylamide copolymers can be reacted with hydroxy acrylates, such as 2-hydroxyethyl acrylate, to provide further polyethylenic resins useful herein. While the foregoing are polyacrylates, one can just as easily form the corresponding methacrylate or crotonate (2-butenoate). By substituting norbornene alcohol for the hydroxyethyl acrylate, one can form norbornene ethers useful herein. Other useful polyethylenic resins are based on epoxy resins. For example, one can take a diglycidyl ether of a bisphenol and esterify it with acrylic acid or etherify it with hydroxyethyl acrylate and thereby form epoxy-based polyacrylic resins. Numerous other examples of polyunsaturated compounds utilizable herein will be readily apparent to those skilled in the field and it is our intention that the scope of polyunsaturated compounds encompassed by this disclosure should include such known materials and not be limited to those specifically identified herein, the specifically named compounds being presented solely for the purpose of illustration of the concept involved.

In like manner, there is a large variety of monounsaturated compounds which are useful in our invention. The monomers preferably contemplated herein are monofunctional esters of acrylic acid having from 4 to about 20 carbon atoms. The acrylate ester can be an alkyl or hydroxyalkyl acrylate, such as methyl acrylate, ethyl acrylate, hydroxyethyl acrylate, propyl acrylate, isopropyl acrylate, hydroxypropyl acrylate, butyl acrylate, isobutyl acrylate, amyl acrylate, hexyl acrylate, octyl acrylate, 2-ethylhexyl acrylate, decyl acrylate, dodecyl acrylate, tetradecyl acrylate, and hexadecyl acrylate. Also contemplated are the acrylic esters of the well known class of ether alcohols having the formula: $ROCH_2CH_2OH$ wherein R is $C_1$-$C_6$ alkyl or phenyl, i.e. the Cellosolves. Examples of such esters are methoxyethyl acrylate (Methylcellosolve acrylate), ethoxyethyl acrylate (Cellosolve acrylate), butoxyethyl acrylate (Butylcellosolve acrylate), isobutoxyethyl acrylate (Isobutylcellosolve acrylate), hexoxyethyl acrylate (Hexylcellosolve acrylate), and phenoxyethyl acrylate (Phenylcellosolve acrylate). The contemplated reactive monomer can be designated by the formula: $CH_2=CHC(O)OR$, wherein R is $C_1$-$C_{15}$ alkyl or hydroxyalkyl; $CH_2H_4OR'$, wherein $R'$ is $C_1$-$C_6$ alkyl or phenyl;

wherein R'' and R''' are $C_1$-$C_4$ alkyl, phenyl, or cresyl;

$$-CH_2CHCH_2OR'''$$
$$\phantom{-CH_2C}|\phantom{H_2OR'''}$$
$$\phantom{-CH_2CH}OH$$

wherein R''' is as previously defined; and $$\phantom{R''''O-(CH}R'''''$$
$$\phantom{R''''O-(C}|$$
$$R''''O-(CHCH_2O)_xH$$

wherein R'''' is $C_1$-$C_4$ alkyl, R''''' is H or $C_1$-$C_3$ alkyl, and x is an integer from 1 to 10.

In the case above where R is $$-R''OCNHR'''$$
$$\phantom{-R''O}\|$$
$$\phantom{-R''O}O$$

the reactive monomer is a carbamoyloxyalkyl acrylate. Compounds of this class are readily prepared by well known methods for preparing carbamates. Thus, a hydroxyalkyl acrylate, e.g. hydroxyethyl acrylate, can be reacted with an isocyanate, e.g. butyl isocyanate, phenyl isocyanate, or cresyl isocyanate to form the carbamoyloxyalkyl acrylate, in the presence of a catalyst, e.g. dibutyltin dilaurate. Alternatively, the carbamoyloxyalkyl acrylate can be prepared by first reacting a hydroxyalkyl acrylate, e.g. hydroxyethyl acrylate, with phosgene in the presence of a base to give a chloroformate intermediate and then further reacting this intermediate with an amine, e.g. ethylamine, butylamine, or aniline, in the presence of a tertiary amine acceptor for HCl, e.g. triethylamine.

When R is $$-CH_2CHCH_2OR'''$$
$$\phantom{-CH_2C}|$$
$$\phantom{-CH_2CH}OH$$

the reactive monomer is an alkyl 2-hydroxypropyl ether acrylate. Compounds of this class are readily prepared by the well known addition esterification reaction of acrylic acid with an alkyl glycidyl ether, e.g. butyl glycidyl ether.

When R is $$\phantom{-R''''O-(CH}R'''''$$
$$\phantom{-R''''O-(C}|$$
$$-R''''O-(CHCH_2O)_xH$$

the reactive monomer will be a polyoxyethylene ether of alkyl acrylate. Generally, these compounds can be prepared by reacting a hydroxyalkyl acrylate with an alkylene oxide (1,2-epoxyalkane), e.g. ethylene oxide, 1,2-epoxypropane, or 1,2-epoxybutane, using a molar ratio of acrylate:alkylene oxide of 1:1 to about 1:10, at about 30°-75° C., and using an initiator such as borontrifluoride etherate. In the specific case wherein the alkylene and the alkyl groups are all ethyl, the acrylate can be prepared by monoesterification of a poly(oxyethylene)glycol (commercially available under the registered trademark Carbowax) with acrylic acid or acryloyl chloride.

Typical examples of carbamoyloxyalkyl acrylates, alkyl or aryl, 2-hydroxypropyl ether acrylates (alkoxy-2-hydroxypropyl acrylates), and hydroxy polyoxyalkylene ethers of alkyl acrylates include butylcarbamoylethyl acrylate, phenylcarbamoylbutyl acrylate, cresylcarbamoylpropyl acrylate, butoxy-2-hydroxypropyl acrylate, phenoxy-2-hydroxypropyl acrylate, cresoxy-2-hydroxypropyl acrylate, hydroxy penta(oxypropyl) ether of ethyl acrylate, hydroxy deca(oxyethylene) ether of butyl acrylate, and hydroxy hexa(oxybutylene) ether of propyl acrylate.

A second important element of the present invention is control of the glass transition temperature (Tg) of the cured coating composition. Acceptable cured coatings are those having a Tg falling within the approximate range of $-10°$ C. to $+100°$ C., preferably between about $+15°$ C. and $+100°$ C. Measurement of Tg may conveniently be made by the use of a differential scanning calorimeter, the Tg being defined as the extrapolated onset of softening of the polymerized coating. Manipulation of the Tg may desirably be accomplished by appropriate selection of molecular structure pendent to the unsaturated sites in the monounsaturated and polyunsaturated components. As a general proposition, unsaturated components having a high degree of linear side chains on the molecular backbone will tend to give rise to coatings having a relatively low Tg, and therefore decreased hardness, compared to unsaturated components having less branching. Conversely, branched or cyclic side chains lead to compounds with a higher Tg, resulting in harder, more brittle films. The Tg is important in that, together with the $\rho$-value, it determines the mechanical strength of the coating. For instance, coatings which are too low in Tg may fail cohesively during or after fabrication of the coated substrate, while a Tg which is too high may bring about brittle failure of the cured coating.

The coating compositions of this invention are intended to be cured by exposure to actinic radiation. Ionizing radiation, such as electron beam radiation, may be used, in which case a photosensitizer is not needed. When the radiation is by ultraviolet light, a photosensitizer is needed. Examples of suitable sensitizers include acetophenone, 4'-t-butyl-2,2,2-trichloroacetophenone, 4'-phenoxy-2,2-dichloroacetophenone, benzophenone, xanthone, benzoin isobutyl ether, benzoin isopropyl ether, and 2-chlorothioxanthone. Phenyl ketones are preferred, especially benzophenone. A tertiary amine co-sensitizer may also be used in the UV curable coating formulation and serves to speed up the cure rate. In order to realize this function, it is necessary to have free amine present. Accordingly, the amine concentration range is from about 1.25 to about 3 times the amount required to neutralize free acidity. The amount required for neutralization can be readily calculated from the determined acid number of the resin. The tertiary amines are normally liquid trialkylamines, trialkanolamines or tertiary mixed alkylalkanolamines. Non-limiting examples of such amines are triethylamine, triisopropylamine, tributylamine, trihexylamine, tri-2-ethylhexylamine, tridodecylamine, methyldiethanolamine, dimethylethanolamine, 2-hydroxyethyldiisopropylamine, and triethanolamine.

It is preferred, in UV curable systems, that a blend of photoinitiators which exhibit absorption maxima in different regions of the ultraviolet spectrum be incorporated into the coating compositions. In this way the rate and uniformity of cure of the coating composition is greatly enhanced. When such blends are employed, it is preferred that the blend include at least one photoinitiator which strongly absorbs ultraviolet light in the region of 2000 to 3000 Angstroms. The total amount of photoinitiator utilized should be from about 0.5% to 7% by weight, and preferably between 1% and 5% by weight of the composition.

The coating compositions described thus far produce clear coatings and are useful as such.

Although a pigmenting agent is not necessary, such an agent may be incorporated into the coating composition of this invention as a useful additive. The amount of pigment necessary to achieve the purpose of using it, i.e. opacity, hiding power and pleasing aesthetic effect, is well known to those skilled in the coatings art. In general, the amount of pigment used can be between about 25 weight percent and about 60 weight percent, relative to the total weight of the entire coating composition. Ordinarily between about 30 weight percent and about 50 weight percent is sufficient. The preferred pigment is titanium dioxide for white base coats, but any well known pigment or pigment extender can be used, such as zinc oxide, bentonite, silica, ochers, and chrome yellows or greens.

Additional benefit is to be realized by the incorporation of internal lubricants and antiblocking agents into the coating compositions. The use of such additives has been found to be beneficial as an aid to unstacking of the coated substrates from inventory as well as as an aid in release from fabrication dies. Lubricants such as waxes, polyethylene, hydrocarbon oils and silicones are useful to control and generally reduce the surface coefficient of friction.

The coating composition may be applied to any of the usual substrates, such as metal, paper, plastics, etc., which must undergo substantial deformation resulting in significant surface stresses leading to failure (adhesive, elastic, etc.) of heretofore known and available coatings. The compositions may be applied to the substrates by any of the usual methods of application, such as wiping, spraying and rollcoat application. Suitable metallic substrates include, for example, aluminum, steel, and tin-plated steel. The rate of application should be sufficient to apply the coating at about 1 to 20 mg/sq.in.

After application, the coating is set by exposure to radiation, preferably ultraviolet light or electron beam, for sufficient time to effect a cure of at least 85% by weight of the volatile components in the coating to a nonvolatile state. If ultraviolet radiation is used to cure the coating film, it is preferred that UV light of a wavelength below 4,000 Angstrom Units be employed. Electron beam radiation suitable for curing operations may be obtained from high energy electrons produced by high voltage electron accelerators. These are well-known and include Van de Graaff accelerators, resonant transformers, transformer rectifiers, microwave waveguide linear accelerators, and synchrotrons.

In the curing operation it is important that the coating composition be blanketed by an inert atmosphere to exclude molecular oxygen to the extent reasonably possible, since oxygen acts as a free-radical scavenger and will have the effect of inhibiting polymerization and resulting in undesirably short polymer chain lengths in the surface of the coating, causing the cured film to be tacky. It is therefore preferred to conduct the curing step in a chemically inert environment, such as provided by gaseous nitrogen or by combustion of natural gas to provide an atmosphere which is substantially free of oxygen.

A further improvement and refinement of this invention is found by subjecting the cured coating to a temperature of from about 93° C. (200° F.) to 260° C. (500° F.) for a period of about 10 seconds to about 10 minutes, preferably from 121° C. (250° F.) to 204° C. (400° F.) for from 30 seconds to 10 minutes. The result of such treatment is to provide even greater resistance of the coating to failure during the fabrication step. The elevated temperature treatment may be utilized either before or after the coated substrate is stacked for inventory storage to achieve the desired result.

The examples which follow will serve to demonstrate specific embodiments of the invention but should not be regarded as limiting the invention in any way, as many alternate selections of materials may be used with equally beneficial results. In the examples, the following abbreviations are used:

1004 = Epon 1004 epoxy resin formed by reaction of epichlorohydrin and bisphenol-A. Epoxide equivalent weight of 833 to 1,000.

A = Reaction product of Epon 1004 and acrylic acid using equivalent quantities of acrylic acid and epoxide groups.

M = Reaction product of A with 0.25 moles of maleic anhydride adhesion promoter per mole of epoxy. Molecular weight approximately 1800 with approximately two reactive acrylate groups per molecule.

828 = Epon 828 diglycidyl ether of bisphenol-A, epoxide equivalent weight of 185–200.

828/H = Reaction product between equivalent quantities of epoxides and hydroxyethyl acrylate. Molecular weight approximately 616 with approximately two reactive acrylate groups per molecule.

TMPTA = Trimethylolpropane triacrylate, MW = 299, three reactive acrylate groups per molecule.

BCEA = Butylcarbamylethyl acrylate, formed by reaction of equivalent amounts of butylisocyanate and hydroxyethyl acrylate. MW = 215, one reactive acrylate group per molecule. Tg of the homopolymer approximately 0° C.

QM589 = Isobornyl acrylate, mole weight 186, Tg of homopolymer approximately 85° C., one reactive acrylate group per molecule.

NVP = n-Vinylpyrollidone, mole weight 111, Tg of the homopolymer approximately 80° C., one reactive unsaturated group per molecule.

P-1 = A chlorinated acetophenone derivative manufactured by Noury Chemical Co. under the trade name Trigonal P-1.

BZ = Benzophenone $TiO_2$ = Titanium dioxide

EXAMPLES 1–8

The example compositions are presented in Table I below together with the calculated ratio $\rho$ of reactive unsaturated groups in polyunsaturated molecules to unsaturated groups present in monounsaturated molecules. All of the examples are based on substantially one level of high MW resin (M). The examples demonstrate the effect of changing the structure of the monoethylenically unsaturated component, the photoinitiator level, and of blends of photoinitiators on Tg and $\rho$ as well as the corresponding effect on fabrication and resistance to blocking.

TABLE I

| Example No. | M | 828/H | TMPTA | BCEA | QM589 | NVP | P-1 | BZ | TiO₂ | p |
|---|---|---|---|---|---|---|---|---|---|---|
| 1 | 15 | — | — | 83 | — | — | 1 | — | — | .0432 |
| 2 | 15 | — | — | 43 | 40 | — | 1 | — | — | .0402 |
| 3 | 15 | — | — | 41 | 40 | — | 1 | 2 | — | .0410 |
| 4 | 15 | — | — | 59 | — | 20 | 5 | — | — | .0367 |
| 5 | 12 | 6 | — | 80 | — | — | 1 | — | — | .0882 |
| 6 | 15 | — | 2.5 | 39.5 | 39 | — | 1 | 2 | — | .1062 |
| 7 | 15 | — | 10 | 73 | — | — | 1 | — | — | .3437 |
| 8 | 12 | — | — | 47 | — | — | — | — | 40 | .061 |

*All coatings contain 1% by weight of a silicone lubricant.

After formulation each of the coating compositions was applied to a size coated aluminum panel at approximately 3 mg/in² and cured by either UV or electron beam radiation in a nitrogen atmosphere. The cure conditions and film characteristics of the cured coating are reported in Table II. Ultraviolet cure (Examples 1–7) was accomplished by passing the coated panel thru the radiation produced by 200 watt Hanovia mercury lamps. The cure rate is expressed in feet per minute of line speed per lamp used (fpm/L). Electron beam radiation (Example 8) is expressed in units of absorbed ionizing radiation dose (Mrad, equal to 1,000,000 rads).

The tests performed were as follows:

Tissue Tacking Rating:

Coatings were drawn down on duplicate 4"×4" metal panels, cured and placed coating surface to coating surface with a single sheet of tissue paper between them. The assembly was then placed under a pressure of 100 pounds (6.25 lb/in²) and heated to 49° C. (120° F.) for 18 hours. After cooling to ambient temperature the panels were rated for ease of separation from the tissue on a scale of 0 to 10, with 10 representing perfect and complete separation of the tissue. A rating of at least 8 is normally required as a commercial standard for blocking resistance.

Bake Yield:

The percent by weight of the coating remaining on a metal panel after cure and after baking in an oven at 177° C. (350° F.) for 5 minutes. This value can be used to compute the percent conversion of volatile components (COVC) in the compostion by the formula:

$$COVC = 100\left[1 - \frac{100 - \text{Bake Yield}}{\text{weight \% of volatile components in formulation}}\right]$$

Drawn Can Fabrication:

A fabrication test which consists of drawing a flat sheet of coated aluminum into the shape of a can having an approximate diameter of 50 mm and depth of 50 mm. The coated side of the panel became the outside of the can. All panels had been baked for 10 minutes at 149° C. or 177° C. prior to fabrication and fabrication ratings are reported as pass or fail. This test is classified as a "high severity" situation and represents a very severe drawing operation resulting in unusually high stress on the cured coating.

TABLE II

| Example No. | $T_g$, °C. | Cure Rate | Bake Yield | Tissue Tack Rating | Fabrication |
|---|---|---|---|---|---|
| 1 | 10 | 33 fpm/L | 95 wt. % | 4 | Pass |
| 2 | 30 | 33 fpm/L | 91 | 6.5 | Pass |
| 3 | 30 | 33 fpm/L | 91 | 9 | Pass |
| 4 | 30 | 25 fpm/L | 93 | 9.5 | Pass |
| 5 | 20 | 25 fpm/L | 95 | 9.5 | Pass |
| 6 | 30 | 33 fpm/L | 93 | 10 | Pass |
| 7 | 15 | 25 fpm/L | 95 | 7 | Fail |
| 8 | 20 | 5 Mrad | 95 | 8 | Pass |

EXAMPLE 1

Demonstrates the result obtained at a p-value of 0.043 when using a monofunctional material (BCEA) which leads to a Tg in the cured coating of below the preferred value of 15° C. While fabrication was excellent, the Tissue Tack Rating was only 4 indicating that the coating would probably not be commercially desirable in terms of blocking resistance.

EXAMPLE 2

Demonstrates the effect of increasing the glass transition temperature of the coating by incorporating a second monounsaturated material (in this case QM589) whose structure leads to a higher glass transition temperature in the cured coating. The glass transition temperature is raised to approximately 30° C. and the Tissue Tack Rating is increased to 6.5 while maintaining acceptable fabrication.

EXAMPLE 3

Demonstrates the value both of increasing photoinitiator level (P-1+BZ=3%) and the use of a photoinitiator (BZ) which has a high absorption in the region of 2000–3000 Angstroms. In this instance the Tissue Tack Rating is increased to 9, providing a completely acceptable product from the standpoint of blocking and fabrication.

EXAMPLE 4

Illustrates the use of alternative structures leading to higher glass transition in the cured coating. In this case NVP was chosen at the 20 wt.% level to provide a $T_g$ of 30° C. A second illustration is also contained in this example, as the P-1 level as raised to 5%. The combination of these two effects provided a Tissue Tack Rating of 9.5 which is fully acceptable. This illustrates the effect which may be achieved by increasing the photoinitiator level within the preferred region of this invention.

EXAMPLE 5

Shows that increasing the p-value to 0.0888, in this instance by adding 6 wt.% of an adduct of Epon 828 and hydroxyethyl acrylate, may be used to improve the Tissue Tack Rating to the acceptable region while providing excellent fabrication. This addition is accompanied by an increased in Tg which may be ascribed to the higher ρ-value. Care should be taken, however, not to increase the ρ-value too high, as will be demonstrated in the examples which follow.

EXAMPLE 6

Demonstrates that the ρ-value may be increased by adding an alternate polyfunctional molecule. In this example TMPTA, a trifunctional acrylate, was added at 2½ wt.% to a composition similar to that used in Example 3. It is found that the Tissue Tack Rating is increased to a perfect 10 which fabrication is still acceptable even though the ρ-value has been increased to 0.1062.

EXAMPLE 7

Included to show that increasing the wt.% level of polyfunctional molecules may be used to increase Tissue Tack (compare Example 1 with 7), but that for the fabrication test used the ρ-value of 0.3437 was too high and led to failure of the coating after fabrication. This coating, however, could be used in a less severe fabrication with excellent results. Consequently, the preferred region of utility of the invention is drawn to include ρ-values up to 0.5 since most applications are, in reality, not nearly as severe as the one used to illustrate the invention.

EXAMPLE 8

Demonstrates two features of the invention. First, that the coating may be pigmented, in this instance with TiO₂, and secondly, that electron beams may be used to desirably affect cure of the coating compositions. The product is acceptable from the standpoint of both Tissue Tack and Fabrication.

EXAMPLE 9

The invention calls for the use of a high MW unsaturated resin of low functionality in combination with a relatively large proportion of monoethylenic monomer having a relatively high Tg. The operative controlling variable in determining how much of the respective components is, however, the quantity ρ. The actual weight range of the high MW resin and the monomer will depend upon the molecular weight of the resin employed. Table III below illustrates the weight ranges of some typical components as they relate to a given limit of ρ-value.

TABLE III
WEIGHT % COMPOSITION FOR SEVERAL RESINS OF DIFFERING MOLECULAR WEIGHT

|  | Epon$^{(1)}$ 1007/A$^{(2)}$ | Epon$^{(1)}$ 1004/A$^{(2)}$ | Epon$^{(1)}$ 828/A$^{(2)}$ |
|---|---|---|---|
| Typical MW | 3500 | 1800 | 600 |
| Wt. % of Resin | 0–81.4 | 0–69.2 | 0–42.9 |
| Wt. % of Monomer | 100–18.6 | 100–30.8 | 100–57.1 |
| Equivalents of Unsaturation per 100 grams |  |  |  |
| Resin$^{(3)}$ | 0–0.047 | 0–0.077 | 0–0.143 |
| Monomer$^{(4)}$ | 0.5–0.093 | 0.5–0.154 | 0.5–0.286 |
| ρ | <0.5 | <0.5 | <0.5 |

Notes:
$^{(1)}$Epon is a register trademark of the Shell Chemical Co.
$^{(2)}$Reaction product of 1 equivalent of acrylic acid with each equivalent of epoxide.
$^{(3)}$Assuming 2 equivalents of unsaturation per molecule.
$^{(4)}$Assuming monomer MW of 200 for purposes of illustration.

The ρ-value was calculated as follows:

$$\rho = (\alpha/\beta)$$

where:

$$\alpha = \left[\frac{\text{weight \% of Resin}}{\text{MW of Resin}}\right] \times \begin{array}{l}\text{equivalents of} \\ \text{unsaturation per} \\ \text{molecule of resin}\end{array}$$

$$\beta = \frac{\text{weight \% of Monomer}}{\text{MW of Monomer}}$$

Alternately, if ρ is preselected then the weight % of resin to be used may be calculated as follows:

$$\text{weight \% of Resin} = \gamma/(1+\gamma)$$

where:

$$\gamma = \frac{(\rho)(\text{MW of Resin})}{(\text{MW of Monomer})(\text{equivalents of unsaturation per resin molecule})}$$

Although the concept disclosed herein has been illustrated with reference to certain specific embodiments, it is to be understood that modifications and variations may be made thereon without departing from the spirit of the disclosed invention, as those skilled in the art will readily understand. Such modifications and variations are therefore considered to fall within the purview and scope of the appended claims.

We claim:

1. A method for preparing a radiation cured coating on a metal substrate which is subsequently fabricated with deformation, which comprises:
   (a) applying to a deformable metal substrate a coating composition comprising a blend of monounsaturated and polyunsaturated molecules, and an internal lubricant such that the molar ratio of reactive unsaturated bonds present in said polyunsaturated molecules to reactive unsaturated bonds present in said monounsaturated molecules is below about 0.5; and said internal lubricant is present in an amount sufficient to allow release of the coated metal substrate upon fabrication with deformation;
   (b) exposing said blend of polymerization-inducing radiation, in the presence of a substantially oxygen-free atmosphere, for a sufficient time to effect a cure of at least 85% by weight of the monomeric unsaturated molecules in the coating having a glass transition temperature in its cured state of between about −10° C. and +100° C.; and
   (c) subjecting the coated metal substrate to fabrication by deformation.

2. The method of claim 1 in which said unsaturated compounds are ethylenically unsaturated.

3. The method of claim 1 in which said molar ratio of unsaturated linkages is below 0.2.

4. The method of claim 1 in which said glass transition temperature of the cured composition is between about +15° C. and +100° C.

5. The method of claim 1 in which said molar ratio of unsaturated linkages is below 0.2 and said glass transition temperature is between about +15° C. and +100° C.

6. The method of claim 1 in which said composition includes a photosensitizer rendering the composition curable with ultraviolet light.

7. The method of claim 6 in which said composition additionally includes at least one other photosensitizer, said other photosensitizer exhibiting UV absorption maxima in different regions of the ultraviolet spetrum from the first photosensitizer, and at least one of said photosensitizers being strongly absorptive of UV light in the region of 2,000 to 3,000 Angstrom units.

8. The method of claim 1 in which said composition includes a pigmenting agent.

9. The method of claim 1 in which said coating is heated at a temperature of from 93° C. to 260° C. for a period of from 10 seconds to 10 minutes subsequent to said radiation curing step.

10. The method of claim 1 in which said coating is heated at a temperature of from 121° C. to 204° C. for a period of from 30 seconds to 10 minutes.

11. The method of claim 1 in which said coating composition comprises:
(a) from 0 wt.% to about 85 wt.%, relative to the mixture of (a) and (b), of a resin having approximately two unsaturated sites per molecule and a molecular weight within the approximate range of 600 to 3500;
(b) from about 18 wt.% to about 100 wt.%, relative to the mixture of (a) and (b), of an ethylenically unsaturated monomer;
(c) the relative proportions of (a) and (b) being such as would result in a $\rho$-value of below about 0.5 and a coating which, when applied to a substrate and suitably cured, will have a Tg within the approximate range of +15° C. to +100° C.

12. The method of claim 11 in which said coating composition additionally comprises from about 0.5% to about 7% by weight of a photosensitizer rendering said composition curable by ultraviolet light.

13. The method of claim 12 in which said photosensitizer comprises a blend of two or more photoinitiators which exhibit absorption maxima in different regions of the ultraviolet spectrum.

14. The method of claim 11 in which said coating composition comprises from 8% to 70% by weight of a resin which is a reaction product of a diglycidyl ether of bisphenol-A with approximately 1 equivalent or acrylic acid per equivalent of epoxy in said ether and from 0 to 0.25 equivalents of maleic anhydride per equivalent of epoxy; from 0 to 10% by weight of trimethylolpropane triacrylate; from about 30% to about 92% of monoethylenically unsaturated monomer comprising butylcarbamylethyl acrylate in admixture with from 0 to 50% of another monomer chosen from the group consisting of vinylpyrollidone and an isobornyl acrylate.

* * * * *